US010126071B2

(12) United States Patent
Wortmann et al.

(10) Patent No.: US 10,126,071 B2
(45) Date of Patent: Nov. 13, 2018

(54) HEAT TRANSFER DEVICE

(71) Applicant: BASF SE, Ludwigshafen (DE)

(72) Inventors: Jürgen Wortmann, Limburgerhof (DE); Michael Ladenberger, Annweiler Am Trifels (DE); Katharina Federsel, Heidelberg (DE); Stephan Maurer, Neustadt (DE)

(73) Assignee: BASF SE, Ludwigshafen Am Rhein (DE)

( * ) Notice: Subject to any disclaimer, the term of this patent is extended or adjusted under 35 U.S.C. 154(b) by 0 days.

(21) Appl. No.: 15/321,257

(22) PCT Filed: Jun. 30, 2015

(86) PCT No.: PCT/EP2015/064774
§ 371 (c)(1),
(2) Date: Dec. 22, 2016

(87) PCT Pub. No.: WO2016/001184
PCT Pub. Date: Jan. 7, 2016

(65) Prior Publication Data
US 2017/0205151 A1    Jul. 20, 2017

(30) Foreign Application Priority Data
Jul. 1, 2014   (EP) .................................. 14175138

(51) Int. Cl.
*F28F 9/22*      (2006.01)
*F28D 20/00*   (2006.01)
(Continued)

(52) U.S. Cl.
CPC ............ *F28D 20/003* (2013.01); *F24S 20/25* (2018.05); *F24S 80/20* (2018.05); *F24S 90/00* (2018.05); *F28D 21/00* (2013.01); *F28D 2020/0047* (2013.01); *F28D 2020/0082* (2013.01); *F28D 2021/0019* (2013.01); *Y02E 10/40* (2013.01); *Y02E 60/142* (2013.01)

(58) Field of Classification Search
CPC ........... F28D 20/003; F28D 2020/0047; F28D 2020/0082; F24J 2/0015; F24J 2/4649; F25B 15/06
USPC ......................................................... 165/145
See application file for complete search history.

(56) References Cited

U.S. PATENT DOCUMENTS 5,934,090 A * 8/1999 Ozu ........................ F25B 15/06
                                                                    62/141

FOREIGN PATENT DOCUMENTS

| WO | WO-2008027041 A1 | 3/2008 |
| WO | WO-2010070195 A2 | 6/2010 |
| WO | WO-2011104328 A2 | 9/2011 |

OTHER PUBLICATIONS

International Preliminary Examination Report for PCT/EP2015/064774 dated Oct. 10, 2016.

(Continued)

*Primary Examiner* — Davis Hwu

(57) ABSTRACT

The invention relates to a device for heat transfer, comprising a low temperature heat exchanger (3) and a high temperature heat exchanger (5), the heat exchangers (3, 5) being connected to one another by means of a connecting line such that a heat transfer medium flows through the high temperature heat exchanger (5) and through the low temperature heat exchanger (3) in succession, at least one dwell time tank (19) being arranged in the connecting line.

19 Claims, 4 Drawing Sheets

Figure 1:
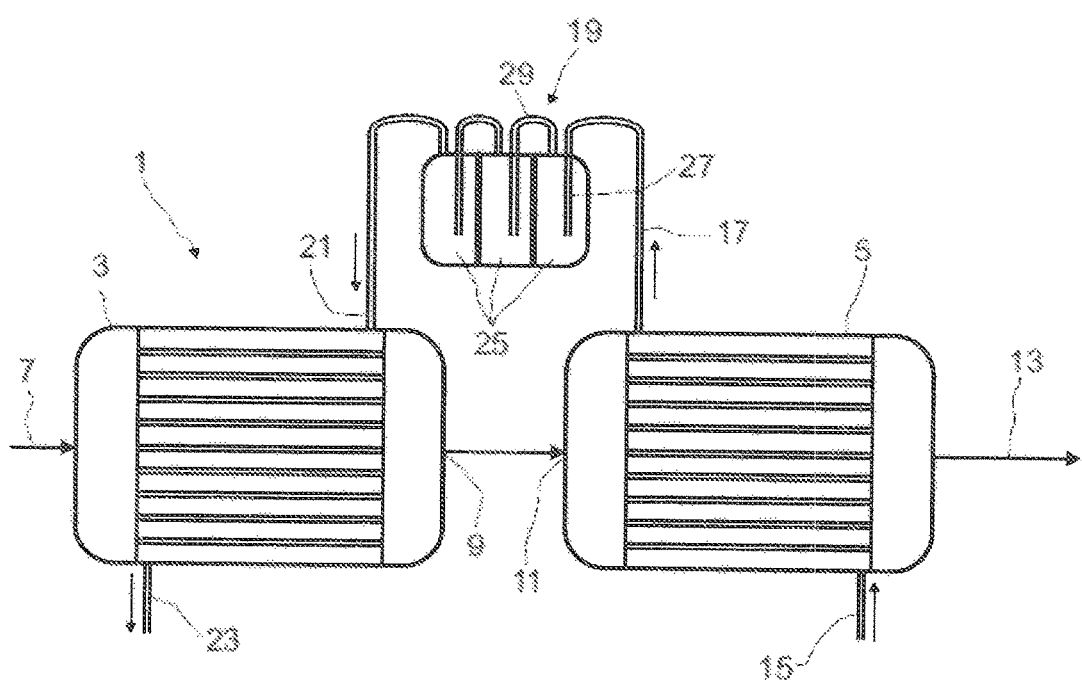

(51) Int. Cl.
  *F28D 21/00* (2006.01)
  *F24S 20/25* (2018.01)
  *F24S 80/20* (2018.01)
  *F24S 90/00* (2018.01)

(56) References Cited

OTHER PUBLICATIONS

International Search Report for PCT/EP2015/064774 dated Aug. 7, 2015.
International Preliminary Examination Report for PCT/EP2015/064774 dated Oct. 10, 2016 (English translation).

* cited by examiner

HEAT TRANSFER DEVICE

CROSS-REFERENCE TO RELATED APPLICATIONS

This application is a national stage application (under 35 U.S.C. § 371) of PCT/EP2015/064774, filed Jun. 30, 2015, which claims benefit of European Application No. 14175138.8, filed Jul. 1, 2014, both of which are incorporated herein by reference in their entirety.

The invention proceeds from a device for heat transfer, comprising a low temperature heat exchanger and a high temperature heat exchanger, the heat exchangers being connected to one another by means of a connecting line such that a heat transfer medium flows through the high temperature heat exchanger and through the low temperature heat exchanger in succession.

So that heat exchangers can be operated effectively and efficiently when it is intended to superheat a medium, usually at least two heat exchangers are connected in series, the medium being brought to boiling point in one heat exchanger so that saturated steam occurs, and the saturated steam generated in the first heat exchanger being superheated in a second heat exchanger. Heat exchanger circuits of this type are used, for example, in power plants where turbines are driven by superheated steam for current generation.

In order to generate electrical energy, for example in solar-thermal power plants, for example parabolic trough solar power plants or Fresnel solar power plants, a heat transfer medium is first heated in suitable receivers by means of irradiating solar energy. For efficient operation of the solar-thermal power plants, the heat transfer medium used is, for example, molten salt which can be heated to temperatures of more than 400° C. The heated molten salt is then used to preheat, evaporate and superheat water. Employing the molten salt makes it possible to operate the solar power plant even without solar radiation, for example at night. For this purpose, the heated molten salt is stored in a container, from which it can be extracted through evaporating and superheating the water even when too little solar radiation is available. It is possible to preheat the water with a hot salt melt which originates from regions of the storage system having lower temperatures than those regions from which the salt melt is taken off which is used for evaporating and superheating the water. The evaporation of the water and the superheating of the water vapor can be supported by one or more intermediate heating stages, which can be provided in on or more apparatuses. After the emission of heat in suitable heat exchangers for evaporating and superheating the water, the molten salt is introduced into a second container.

As soon as sufficiently high solar radiation is available again, the molten salt is conducted out of the second container through the receivers in which it is heated anew. Suitable salts for the molten salt are, for example, nitrates or nitrites of the alkali metals, for example potassium nitrate, potassium nitrite, sodium nitrate or sodium nitrite or their mixtures. A suitable salt is, for example, what is known as solar salt, a mixture of sodium nitrate and potassium nitrate in a ratio of 60:40.

Since, in an evaporator, the volume of liquid to be evaporated increases because of phase transformation and, moreover, a superheater is usually configured differently from an evaporator on account of the lower heat transfer coefficient of a gas, evaporation and superheating take place in two different heat exchangers. In this case, the heat exchangers may also be arranged in a single apparatus having high temperature and low temperature sections.

Owing to the high temperatures to which the salt is heated in the receivers, decomposition products may be formed. The decomposition reactions are, in principle, reversible in the case of many heat transfer media. However, regeneration at low temperatures is appreciably reduced due to two effects. On the one hand, the solubility of highly volatile components, for example gases, in heat transfer media is limited. If their solubility limits are overshot, an outgassing of decomposition products means that the reaction partners no longer congregate for a back reaction, since they are in different phases and the overcoming of the phase limit is impeded, for example, by diffusion resistances. This problem can be solved by operating the heat exchanger at sufficiently high pressure. On the other hand, cooling of the partly decomposed molten salt causes the reaction rates of the regeneration reactions to fall. The reaction rates, as a rule, are dependent exponentially upon the temperature. In the case of a rapidly falling temperature, such as is customary in a heat exchanger as a consequence of its functioning, temperatures are quickly reached at which the regeneration rates become so low that virtually no regeneration becomes possible. Over a plurality of work cycles, the decomposition products may accumulate until the properties of the heat transfer medium have changed to an extent such that it is unsuitable for heat transfer. One harmful change is, for example, that too high a corrosiveness is created.

If, for example, nitrate and nitrite salts are employed as heat transfer media, high temperatures lead to decomposition into oxides and nitrogen oxides. This decomposition reaction is reversible, nitrite salts being formed again from the nitrate salts and oxides, for example in the presence of nitrogen monoxide, at lower temperatures and when the dwell time is sufficiently long. For regeneration, for example, part of the salt is extracted from the process and is regenerated again in suitable apparatuses. This requires an additional outlay in terms of apparatus, and moreover it is necessary to keep the molten salt fraction extracted for regeneration in stock and to feed it, as required, into the salt-carrying pipelines. Also, the necessary means have to be provided for regeneration. Particularly when gases formed during operation are separated and sluiced out, these have to be provided again for regeneration.

The object of the present invention is to provide a device for heat transfer, comprising a low temperature heat exchanger and a high temperature heat exchanger, which makes it possible to regenerate the heat transfer medium.

The object is achieved by means of a device for heat transfer, comprising a low temperature heat exchanger and a high temperature heat exchanger, the heat exchangers being connected to one another by means of a connecting line such that a heat transfer medium flows through the high temperature heat exchanger and through the low temperature heat exchanger in succession, at least one dwell time tank being arranged in the connecting line.

By the dwell time tank being arranged between the high temperature heat exchanger and the low temperature heat exchanger, the heat transfer medium first transmit heats to the fluid to be heated, with the result that the temperature of the heat transfer medium decreases. The dwell time tank provides sufficient time, at the lower temperature, for the heal transfer medium to be regenerated. Thus, for example, decomposition of the heat transfer medium which has taken place at high temperatures and is reversible at low temperatures can be canceled again in the dwell time tank. The selected temperature of the dwell time tank is in this case preferably so low that, on the one hand, the regeneration reaction is assisted thermodynamically. On the other hand, the temperature is preferably kept sufficiently high that a large fraction of the thermally partly decomposed heat transfer medium can be regenerated in a kinetically controlled manner. As result, the heat transfer medium can be used for a longer period of time and for a large number of cycles, and it is not necessary at relatively short time intervals to extract parts of the heat transfer medium or the entire heat transfer medium from the process and deliver it for external regeneration or even disposal.

In order to allow regeneration, it is especially advantageous if secondary products formed as result of decomposition are not removed from the process, but instead are available in the dwell time tank for the regeneration of the heat transfer medium. Alternatively, it is also possible, optionally, to deliver substances required for regeneration. It is preferable, however, to utilize the secondary components occurring during reversible decomposition for regeneration in the dwell time tank.

So that a sufficiently large part of the heat transfer medium is regenerated, the selected regeneration time must be sufficiently long. A sufficiently long regeneration time is obtained, in the case of an operationally stipulated current intensity, by the choice of a sufficiently large reaction volume. For example, for a mixture of nitrate salts and nitrite salts at 450° C., the dwell time tank may have such large dimensioning that half an hour of regeneration time is available.

The regeneration can be supported by heightening the partial pressures of the nitric oxides.

In order to avoid large costly dwell time tanks and so that smaller more cost-effective tanks can be employed, regeneration catalysts may be added in order to accelerate the reaction. An effective regeneration catalyst is water. The regeneration catalyst is injected under pressure into the heat transfer medium flow upstream of the dwell time tank. A gaseous catalyst can be separated out of the heat transfer medium flow downstream of the dwell time tank by the lowering of pressure and by outgassing. To add the regeneration catalyst, the device according to the invention therefore has, in one embodiment, an adding point for the regeneration catalyst, said adding point being positioned upstream of a dwell time tank.

In the case of nitrate and nitrite salts, excess water may promote further decomposition. In order to avoid water-induced decomposition, the addition of water as a regeneration catalyst must be metered. The metering of the regeneration catalyst can be monitored and regulated by analytic means. For example, MS, FTIR and NDIR measurement systems may be employed as process-analytic sensors in a control loop. These, for example in the gas space of the heat transfer medium flow, can determine water or nitrogen oxides after the lowering of pressure. An alternative measuring method in the control loop is the electrochemical determination of the oxoacidity potential. For the metering of the regeneration catalyst, the device therefore preferably comprises a control unit or a regulation unit, by means of which the addition of the regeneration catalyst is controlled and/or regulated. The control unit or regulation unit is in this case setup such that the above-described monitoring and control steps can be carried out in an automated manner.

The high temperature heat exchanger and the low temperature heat exchanger may be structurally separate units. However, it is also possible, alternatively, that the high temperature heat exchanger and the low temperature heat exchanger form in each case a section of one heat exchanger, and the connecting line branches off from the region, through which the heat transfer medium flows, of the low temperature heat exchanger and issues into that region of the high temperature heat exchanger through which the heat transfer medium flows.

In a preferred embodiment, the region, through which the heat transfer medium flows, between the low temperature heat exchanger and the high temperature heat exchanger has a flow barrier, and the connecting line connects the regions, through which the heat transfer medium flows, of the low temperature heat exchanger and of the high temperature heat exchanger to one another, so that the heat transfer medium flows out of the section forming the high temperature heat exchanger, via the connecting line, into the section forming the low temperature heat exchanger or out of the section forming the low temperature heat exchanger, via the connecting line, into the section forming the high temperature heat exchanger.

A suitable flow barrier is, for example, a separating floor or a separating sheet, by means of which the duct through which the heat transfer medium flows is closed. Alternatively, it is also possible to provide a first throughflow region for the section forming the low temperature heat exchanger and a second throughflow region, separated structurally from the first throughflow region, for the section forming the high temperature heat exchanger. For this purpose, it is possible, for example, in the case of a tube bundle heat exchanger or a plate heat exchanger, to provide two separate casings which adjoin one another and through which the heat transfer medium flows.

The heat transfer medium and the fluid to be heated may flow through the low temperature heat exchanger and the high temperature heat exchanger in cocurrent or in countercurrent. Throughflow in crosscurrent or a combination of crosscurrent and countercurrent or crosscurrent and cocurrent is also possible. In this case, the flow routings in the high temperature heat exchanger and in the low temperature heat exchanger may also be different, for example cocurrent in the high temperature heat exchanger and countercurrent in the low temperature heat exchanger, or vice versa. It is preferable, however, if the flow passes through the low temperature heat exchanger and the high temperature heat exchanger in each case both in countercurrent or both in cocurrent. It is especially preferable if the heat transfer medium and the fluid to be heated flow through the high temperature heat exchanger and low temperature heat exchanger in countercurrent.

Furthermore, the heat transfer medium may flow either first through the low temperature heat exchanger and then through the high temperature heat exchanger or first through the high temperature heat exchanger and then through the low temperature heat exchanger. It is preferable if the heat transfer medium flows first through the high temperature heat exchanger and then through the low temperature heat exchanger. The combination is especially preferable in this case in which the flow passes through both the high temperature heat exchanger and the low temperature heat exchanger in countercurrent and the heat transfer medium flows first through to the high temperature heat exchanger and thereafter through the low temperature heat exchanger.

Independently of the flow direction and the order in which the heat transfer medium flows through the heat exchangers, according to the invention the dwell time tank is always arranged in the connecting line between the low temperature heat exchanger and the high temperature heat exchanger.

In order to allow regeneration of the entire heat transfer medium used, the situation must be avoided where, as result of intermixing, part of the heat transfer medium is extracted again in immediately after introduction into the dwell time tank.

For this purpose, it is possible, for example, to configure the dwell time tank in the form of a pipe coil through which the heat transfer medium flows. The dwell time is in this case set by the length and diameter of that pipe of the pipe coil through which the heat transfer medium flows. The longer the pipe is, the diameter being the same, or the larger the diameter is, the pipe length being the same, the longer is the dwell time in the pipe when the volume flow is constant.

Alternatively, it is also possible to use as dwell time tank a tank in which floors are accommodated, each floor having an outflow, and the outflows being arranged such that they are in each case arranged alternately at opposite ends. The heat transfer medium thereby flows in each case through an outflow onto the floor lying beneath, via the floor to the outflow of the latter and through the outflow onto the floor lying beneath. This results in a meandering flow in the dwell time tank and consequently in a sufficient dwell time of the entire heat transfer medium. The length of the dwell time can in this case be set by means of the number of floors and the geometry of the tank.

In a preferred embodiment, the dwell time tank comprises two storage cells, the individual storage cells being connected to one another in the direction from the low temperature heat exchanger to the high temperature heat exchanger in each case via a connection from the lower region of a first storage cell to the upper region of an adjacent second storage cell. As result of this configuration, the heat transfer medium is admittedly fully mixed in each individual storage cell, but since the heat transfer medium has to pass through a plurality of storage cells, the dwell time is kept sufficiently long here, too. Moreover, since a storage cell is filled from above and emptied from below or, conversely, is filled from below and emptied from above, a stratified flow, by means of which full mixing is largely avoided, can be set in the storage cell.

In one embodiment of the invention, the connection between two storage cells comprises a cell interspace, the connection from the cell interspace to the upper region of the second storage cell being formed with an overflow and that from the cell interspace to the lower region of the first storage cell being formed by a partition with an orifice, so that, in the case of a throughflow of the storage cells from the high temperature heat exchanger to the low temperature heat exchanger, the liquid flows in each case through the orifice in the lower region of the partition into the cell interspace and via the overflow out of the cell interspace into the second storage cell or, in the case of a flow in the opposite direction, flows via the overflow into the cell interspace and through the orifice in the lower region of the partition out of the cell interspace into the first storage cell.

Alternatively, it is also possible to implement the connection between two storage cells in each case by means of one or more pipelines running parallel.

Furthermore, it is preferable if at least one storage cell is closed by means of a cover, so that a gas space is formed between the liquid in the storage cell and the cover. It is especially preferable if all the storage cells are closed by means of a cover, in order, particularly when gaseous secondary products are formed as result of decomposition of the heat transfer medium, to avoid the situation where the gaseous secondary products are discharged into the surroundings.

If only one storage cell is closed by means of a cover, this storage cell may be utilized, for example, in order to deliver gas by means of which the heat transfer medium can be regenerated. In this case, it is advantageous, furthermore, if the heat transfer medium is fully mixed in the storage cell, so that as large a part of the heat transfer medium as possible comes into contact with the gas. For this purpose, it is preferable that the gas is injected into the heat transfer medium via a suitable adding device.

So that the heat transfer medium can be regenerated well when it is decomposed so as to form gaseous secondary products, it is advantageous if a pipeline branches off from at least one gas space and is immersed into the liquid of a storage cell positioned nearer to the low temperature heat exchanger or into the liquid in the connection of two adjacent storage cells, at least one of the adjacent storage cells having a lower temperature than the temperature of the storage cell from the gas space of which the pipeline branches off. This embodiment is advantageous especially when the regeneration of the heat transfer medium is improved at decreasing temperatures. Should a heat transfer medium in which regeneration is improved at increasing temperature be employed, the pipeline should not be immersed into the adjacent storage cell which is positioned nearer to the low temperature heat exchanger, but instead into the storage cell positioned nearer to the high temperature heat exchanger. Should the heat transfer medium flow first through the low temperature heat exchanger and thereafter through the high temperature heat exchanger during operation, it is preferable if the pipeline runs exactly in the opposite direction, that is to say, in the case of better regeneration at lower temperatures, into a storage cell issuing nearer to the high temperature heat exchanger and, in the case of better regeneration at high temperatures, into a storage cell positioned nearer to the low temperature heat exchanger.

By means of the pipeline branching off from the gas space, the gas can flow out of a gas space into another storage cell having a different temperature and can react there with the heat transfer medium at a more suitable temperature for regeneration.

In this case, in the adjacent storage cells, temperature differences are established which result from non-ideal insulation or in the case of a longer dwell time because of heat exchange effects in a storage cell. Furthermore, temperature differences may arise due to energy absorption in the case of endothermal regeneration or heat emission in the case of exothermal regeneration.

In addition to the configuration in which only one pipeline branches off from at least one gas space of a storage cell, it is also possible that two pipelines branch off from a gas space. If the first pipeline issues into a storage cell which is positioned nearer to the low temperature heat exchanger, the second pipeline is immersed into the liquid of a storage cell which is positioned nearer to the high temperature heat exchanger. Correspondingly, the second pipeline is immersed into a storage cell positioned nearer to the low temperature heat exchanger if the first pipeline issues into a storage cell positioned nearer to the high temperature heat exchanger.

In addition to the suitable dwell time and the introduction of the gas into a storage cell with a suitable temperature for regeneration, the pipelines which are immersed into the liquid of another storage cell have, in particular, the advantage that pressure differences in the gas spaces can be compensated.

In order, furthermore, to make it possible that gas can flow out of a gas space in a directed manner in only one direction, it is possible, furthermore, to provide in one or more pipelines which branch off from the respective gas spaces valves, by means of which the pipelines can be opened or closed.

In order to allow gas compensation in the device as a whole, it is especially preferable if all the storage cells are closed by means of a cover and a pipeline branches off at the cover from all the storage cells, apart from that positioned nearest to the low temperature heat exchanger, and issues in the adjacent storage cell positioned nearer to the low temperature heat exchanger or in the connection of the storage cell to the adjacent storage cell which is positioned nearer to the low temperature heat exchanger, and a gas outlet branches off from the cover of the storage cell which is positioned nearest to the low temperature heat exchanger.

If, alternatively or additionally, pipelines are also provided which are immersed into the liquid of a storage cell which is positioned nearer to the high temperature heat exchanger, it is especially preferably, furthermore, if all the storage cells are closed by means of a cover and a pipeline branches off out of the cover from all the storage cells, apart from that positioned nearest to the high temperature heat exchanger, and is immersed into the liquid of the adjacent storage cell which is positioned nearer to the high temperature heat exchanger.

In addition to the immersion of the pipelines into the in each case adjacent storage cell, any other configuration is, of course, also possible. Thus, for example, it is possible that the pipelines do not issue into the directly adjacent storage cell, but instead, for example, in each case jump over at least one storage cell. In this case, the pipelines can then issue out of the gas spaces of the storage cells for which there are no longer corresponding storage cells positioned nearer to the low temperature heat exchanger or nearer to the high temperature heat exchanger, for example, in each case into the storage cell positioned nearest to the low temperature heat exchanger or into the storage cell positioned nearest to the high temperature heat exchanger. Alternatively, it is also possible to provide a plurality of gas outlets and to extract the gas from the storage cells for which there are no longer any corresponding storage cells which are positioned nearer to the low temperature heat exchanger or nearer to the high temperature heat exchanger and into which the pipeline can issue.

In order to achieve especially good gas distribution in the liquid, especially when the gas contains secondary components which occur as result of the decomposition of the heat transfer medium and can be reutilized for regeneration by reversible reaction of the heat transfer medium, it is preferable if there is formed at at least one end, immersed into the liquid, of the pipeline a gas distributor, by means of which gas flowing through the pipeline is distributed in the form of small bubbles in the liquid. It is especially preferable if there is formed at all the ends, immersed into the liquid, of the pipelines a gas distributor, by means of which gas flowing through the pipelines is distributed in the form of small bubbles in the liquid. A corresponding gas distributor may be configured, for example, in the form of a closing plate having many small orifices. In order to keep the pressure loss as low as possible, it is in this case advantageous to provide at the end of the pipeline a widening in diameter which is closed by means of the plate. Alternatively, any other gas distributors may also be used, for example ring distributors or pipelines in which small orifices through which the gas can escape are provided. In addition, a large gas/liquid interface can be implemented by means of conventional fittings or fillings in the storage cells.

So that the contact time of the gas in the liquid is as long as possible, it is preferable, furthermore, if the pipelines branching off from the cover are immersed at least into the lower third of the liquid when the storage cell is filled as far as the overflow. The gas therefore has to flow upward through a long extent of liquid until it reaches the gas space of the storage cell. Since, as result of immersion, the hydraulic pressure in the liquid has to be overcome so that the gas can flow out of the pipeline into the liquid, it is preferable, furthermore, to accommodate in the pipeline a compressor, by means of which the gas is transported into the liquid of the adjacent storage cell or into the cell interspace. The compressor is in this case to be designed such that the hydraulic pressure of the liquid at the pipeline end can be overcome so that the gas flows correspondingly through the pipeline. A further advantage of using a compressor is that a directed offtake of gas from a gas space of a storage cell is possible. Contrary to the embodiment without a compressor, gas can be extracted and delivered to an adjacent storage cell even when the pressure in the gas space is still lower than the pressure at the point where the pipeline issues in the liquid.

In one embodiment of the invention, a device for conveying the liquid is arranged in the connection between two adjacent storage cells. By means of the device for conveying the liquid, it is possible to convey the liquid into an adjacent storage cell independently of the hydrostatic pressure. This allows transport, for example, even when two storage cells are filled to the same height or even when in the storage cell from which liquid is extracted, has a lower filling level than in the adjacent storage cell into which the liquid is transported. The operation of the device is thereby ensured independently of the filling levels in the individual storage cells. Thus, for example, it is not necessary for all the storage cells to stand at the same height and be filled to the same height. The device for conveying the liquid also makes it possible to place identically configured storage cells, which preferably have in each case an identical filling height, at a different floor level.

A pump is usually employed as a device for conveying the liquid. In this case, any pump, for example a submersible pump, may be used, which can provide the desired liquid throughput and is suitable for conveying the heat transfer medium used.

If a cell interspace, through which the liquid is transported, is formed between two adjacent storage cells, it is advantageous to position the device for conveying the liquid in the orifice in the lower region of the first storage cell. In order to enable the liquid to be transported both from the first storage cell into the adjacent second storage cell and in the opposite direction, it is possible to use two pumps in each case with an opposite conveying direction and then in each case to operate the pump by means of which the liquid is conveyed in the desired direction. Alternatively, it is also possible to employ one pump, by means of which reversal of conveyance is possible, so that, by means of the same pump, liquid can be conveyed, as required, from the first storage cell into the adjacent second storage cell or, conversely, from the second storage cell into the first storage cell.

When two storage cells are connected via a pipeline, the device for conveying the liquid can be placed in any position in the pipeline. Particularly when two storage cells are connected via a pipeline, it is preferable if the device used for conveying the liquid is a pump in which the conveying direction can be reversed. Alternatively, in this case, it is also possible to configure the pipeline with a bypass, a first pump being arranged in the region of the bypass in the pipeline and a second pump being arranged in the bypass, so that, depending on the conveying direction, the liquid is conveyed either through the pipeline or through the bypass. Furthermore, in addition to the configuration with a bypass, it is, of course, also possible to connect two adjacent storage cells in each case with two pipelines, a device for conveying a liquid being used in each pipeline, and the conveying directions of the devices for conveying the liquid in the pipelines being opposed.

Particularly in conjunction with the device for conveying the liquid between two storage cells, it is preferable to install in the storage cells a filling level control which is setup such that liquid is conveyed into an adjacent storage cell when a maximum filling level is reached. It is thereby possible to remove liquid from a storage cell in a directed manner when the maximum filling level is overshot. It can thereby be ensured, for example, that a minimum gas space is always present above the liquid. Moreover, overfilling of the storage cell, which may then lead to a pressure rise, can be avoided.

In addition to a filling level control in which liquid is conveyed into an adjacent storage cell when the maximum filling level is reached, it is also possible to provide a filling level control which is set up such that liquid is conveyed out of an adjacent storage cell into the storage cell when a minimum filling level is undershot. This may be necessary particularly for reliable operation in order, for example, to avoid the situation where pumps may run dry.

If the individual storage cells are to have different temperatures, for example a temperature decrease from the storage cell positioned nearest to the high temperature heat exchanger as far as the storage cell positioned nearest to the low temperature heat exchanger, temperature compensation between storage cells is to be avoided and, furthermore, thermal expansions on account of temperature changes are to be compensated, it is, of course, also possible to introduce temperature-resistant and pressure-resistant insulating material between the storage cells. It is preferable in this case, in particular, if thermal insulation is accommodated between adjacent storage cells in the helical arrangement which are not connected to one another via a cell interspace.

For filling or draining it is possible to provide connections between the storage cells. These have to be designed so narrow on one hand that only small amounts of salt are conveyed through them and that only a negligible leakage occurs. On the other hand the connections have to be designed big enough to allow filling and draining of the dwell time tank in a period of time which is acceptable for the operator.

The device according to the invention can be employed wherever a medium is heated in two heat exchangers connected in series and the heat transfer medium is advantageously intermediately stored at a temperature which is below the delivery temperature of the first heat exchanger and above the outlet temperature from the second heat exchanger, for example for regeneration.

Especially advantageously, the device according to the invention can be used when a fluid is evaporated in a first heat exchanger and is superheated in a second heat exchanger, and a heat transfer medium is employed which may be decomposed at the high temperatures for superheating and can be regenerated again at somewhat lower temperatures.

In an application in which a fluid is first evaporated and then superheated, the low temperature heat exchanger is an evaporator and the high temperature heat exchanger is a superheater. For example, water may be used as fluid which is evaporated and then superheated. Superheated water is employed, for example, in power plants where superheated steam drives a turbine, by means of which, in turn, a generator for the generation of electrical current is driven.

Especially preferably, the device according to the invention is used in a solar power plant, in particular in a linearly concentrating solar power plant, for example a parabolic trough solar power plant or Fresnel solar power plant, or else in a solar tower power plant.

In use in a solar power plant, the heat transfer medium employed is preferably a molten salt, for example a mixture of nitrates and/or nitrites of the alkali metals, in particular sodium nitrite, sodium nitrate, potassium nitrite, potassium nitrate or any mixture thereof.

Since, in particular, nitrite salts may be decomposed at high temperatures into oxides and nitrate salts, with nitrogen monoxide being split off, the reaction being reversible, the device according to the invention is employed especially preferably for the superheating of steam in a solar power plant in which the heat transfer medium used is a molten salt which also contains nitrite salts. In the dwell time tank, the salt can be regenerated by means, of the reaction which takes place at lower temperature and in which a nitrite salt is formed again from the nitrate salt, the oxide and nitrogen monoxide.

Exemplary embodiments are illustrated in the figures and are explained in more detail in the following description.

Figure 2:
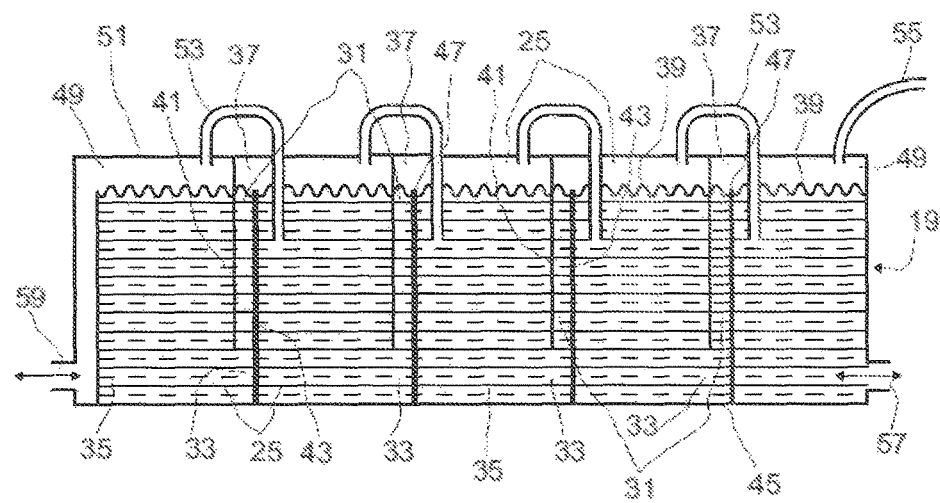
Figure 3:
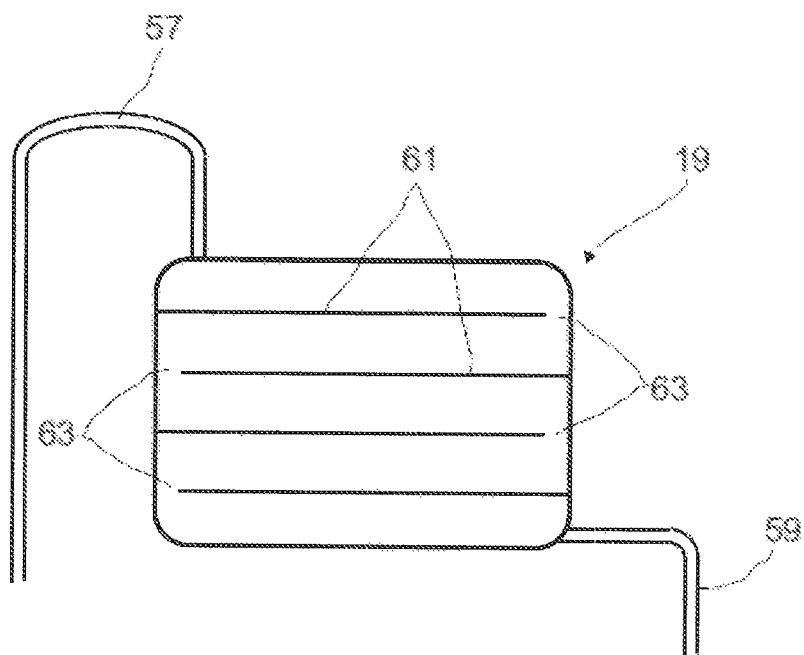
Figure 4:
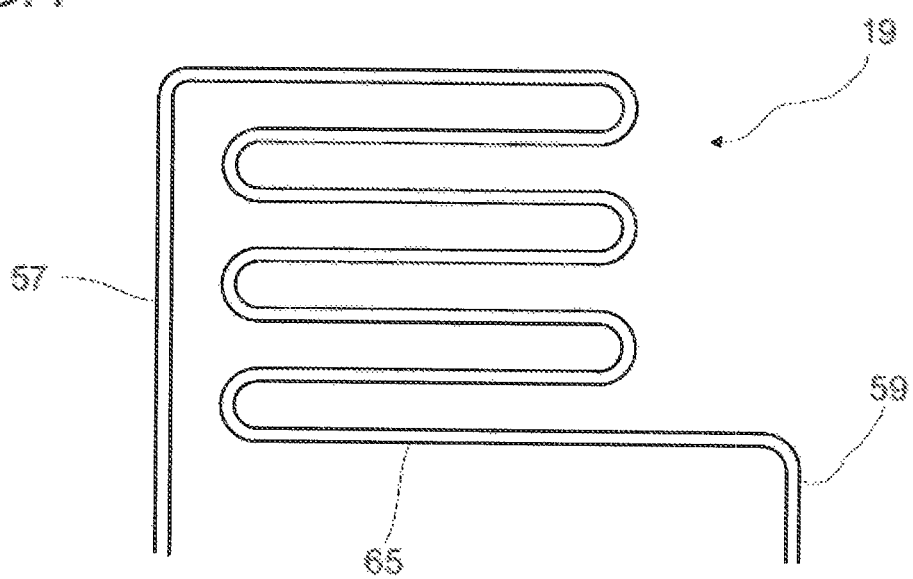
Figure 5:
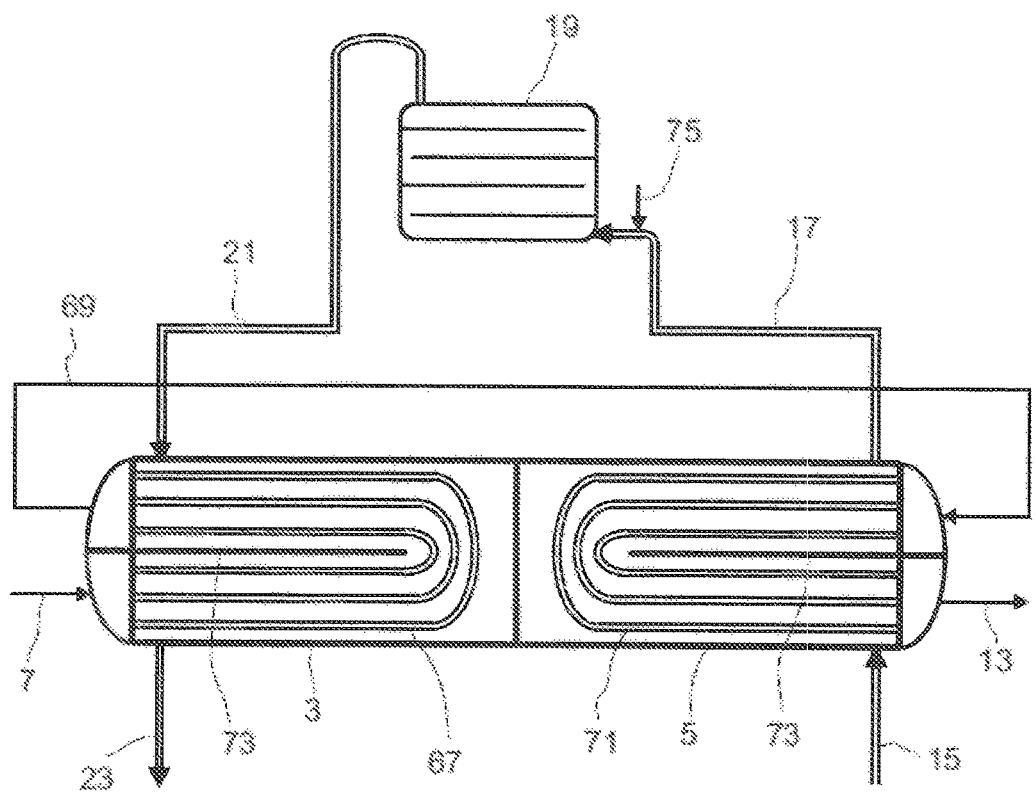

In the figures:

FIG. 1 shows a diagrammatic illustration of a device with low temperature heat exchanger, high temperature heat exchanger and dwell time tank, FIG. 2 shows a dwell time tank with a plurality of storage cells connected in series, FIG. 3 shows a dwell time tank in a further alternative embodiment, FIG. 4 shows a dwell time tank in a fourth alternative embodiment, FIG. 5 shows an embodiment of the invention in which a high temperature heat exchanger and a low temperature heat exchanger are arranged in one apparatus.

FIG. 1 illustrates diagrammatically a device with a low temperature heat exchanger, a high temperature heat exchanger and a dwell time tank.

A device 1 with a low temperature heat exchanger 3 and with a high temperature heat exchanger 5 may be used, for example, for the evaporation and superheating of water. In this case, the low temperature heat exchanger 3 is an evaporator and the high temperature heat exchanger 5 is a superheater.

The low temperature heat exchanger 3 and the high temperature heat exchanger 5 may in each case be designed, for example, as illustrated here, as tube bundle heal: exchangers. Alternatively, however, any other type of construction known to a person skilled in the art can be employed for heat exchangers. Thus, for example, plate heat exchangers, spiral heat exchangers or any combination of different types of heat exchanger may also be used.

Furthermore, it is also possible that the low temperature heat exchanger 3 and the high temperature heat exchanger 5 are combined structurally in one apparatus.

In operation, a fluid to be heated passes via an inflow 7 into the low temperature heat exchanger 3 and is heated in the latter. If the low temperature heat exchanger 3 is an evaporator, the fluid is evaporated in this, so that saturated steam, if appropriate even already slightly superheated steam, occurs. The fluid heated in the low temperature heat exchanger 3 is extracted at an outlet 9 and is delivered via an inflow 11 to the high temperature heat exchanger. In the high temperature heat exchanger 5, the fluid is heated further or, if the high temperature heat exchanger 5 is a superheater, the fluid delivered as steam is superheated in the high temperature heat exchanger 5. The heated fluid or the superheated steam then emerges from the high temperature heat exchanger at an outlet 13 and can be delivered for further use, for example to a turbine for driving a generator for current generation when the device 1 is employed in a power plant, for example a solar power plant.

If the low temperature heat exchanger 3 and the high temperature heat exchanger 5 form a structural unit, the fluid heated in the part forming the low temperature heat exchanger 3 passes directly into the part forming the high temperature heat exchanger 5.

To heat the fluid, a heat transfer medium is used. In the embodiment illustrated here, this is carried in countercurrent to the fluid to be heated. The heat transfer medium is delivered via a heat transfer medium inflow 15 to the high temperature heat exchanger 5. In the high temperature heat exchanger 5, the heat transfer medium transmits heat to the fluid to be heated and subsequently leaves the high temperature heat exchanger 5 via a heat transfer medium outflow 17. According to the invention, a pipeline forming the heat transfer medium outflow 17 issues in a dwell time tank 19.

After running through the dwell time tank 19, the heat transfer medium is delivered to the low temperature heat exchanger 3 via a heat transfer medium inflow 21. In the low temperature heat exchanger 3, the heat transfer medium transmits heat to the fluid to be heated and then leaves the low temperature heat exchanger 3 via a heat transfer medium outflow 23.

In the dwell time tank 19, the heat transfer medium may, for example, be regenerated if this is possible at a lower temperature than the maximum temperature to which the heat transfer medium is heated and, moreover, if the heat transfer medium changes reversibly at the maximum temperature. Such heat transfer media are, for example, as already mentioned above, nitrite salts which react at high temperatures to form oxide and nitrate salt, with nitrogen monoxide being split off. At low temperatures and when the dwell time is sufficiently long, the nitrate salt and the oxide will react with the nitrogen monoxide again to form nitrite salt.

In the embodiment illustrated in FIG. 1, the dwell time tank 19 has a plurality of storage cells 25. The heat transfer medium, after running through the high temperature heat exchanger 3, is introduced via a first pipeline 27 into a first storage cell of the dwell time tank 19. The first pipeline 27 in this case issues in the lower region, so that the heat transfer medium is introduced into the first storage cell at the bottom and the heat transfer medium already contained in the storage cell is displaced upward. The storage cell 25 is closed on top, and the second pipeline 29 branches off from the cover and ends in the lower region of a second storage cell 25. The displaced heat transfer medium is thus pressed into the second pipeline 29 and through the second pipeline into the second storage cell 25. This may be repeated with any number of storage cells, the number of storage cells depending on their size and on the desired dwell time of the heat transfer medium in the dwell time tank 19.

A pipeline then branches off from the last storage cell 25 and forms the inflow 21 to the low temperature heat exchanger 3.

Alternatively to the flow direction illustrated here, it is also possible that the heat transfer medium is carried in the low temperature heat exchanger 3 and in the high temperature heat exchanger 5 in each case in cocurrent to the fluid to be heated. In this case, too, the heat transfer medium can flow first through the high temperature heat exchanger 5 and thereafter through the low temperature heat exchanger 3. Furthermore, it is also possible, independently of the throughflow of the low temperature heat exchanger 3 and high temperature heat exchanger 5, that the heat transfer medium flows first through the low temperature heat exchanger 3 and thereafter through the high temperature heat exchanger 5.

FIG. 2 illustrates a dwell time tank which is constructed from a plurality of storage cells.

In the embodiment illustrated in FIG. 2, the dwell time tank 19 comprises a plurality of storage cells 25. In each case two adjacent storage cells 25 have a connection which is configured such that the lower region of one storage cell 25 is connected to the upper region of an adjacent storage cell 25. The connection is configured here in the form of a cell interspace 31. So that liquid transport via the cell interspace 31 can be implemented, the cell interspace 31 is connected via a lower orifice 33 to the lower region 35 of the one storage cell 25 and via an upper orifice 37 to the upper region 39 of the adjacent storage cell 25. The cell interspace 31 and the orifices 33, 37 may be implemented, for example, such that the cell interspace 31 is delimited with respect to the one storage cell 25 by means of a first wall 41 and with respect to the adjacent second storage cell 25 by means of a second wall 43. The first wall 41 in this case ends above the bottom 45 of the storage cell 25 and the cell interspace 31 such that the lower orifice 33 is formed between the bottom 45 and the first wall 41. Alternatively, it is, of course, also possible to form a sufficiently large orifice in the first wall 41. By contrast, the second wall 43 stands on the bottom between the cell interspace 31 and the adjacent storage cell 25, the second wall 43 ending, below the maximum filling height of the storage cell 25, in an overflow 47, so that the liquid flows out of the one storage cell 25 via the overflow into the cell interspace 31. Alternatively to the overflow 47, it is also possible to form in the corresponding position in the second wall 43 an orifice through which the liquid can flow.

A gas space 49 is located above the liquid in each storage cell 25. The gas space 49 is closed by means of a cover 51. A pipeline 53 branches off from the gas space 49. The pipeline 53 is in this case routed such that it issues in the liquid of an adjacent storage cell 25. So that overpressure does not build up in the last storage cell 25, the latter is provided with a gas outlet 55 through which the gas can be taken off. The gas taken off from the gas outlet 55 may either be discharged into the surroundings or preferably be delivered to a storage cell 25 again, for example via a separate gas inflow.

The liquid is introduced into the dwell time tank via an inflow 57 and is discharged via an outflow 59. In this case, either the inflow 57 is located in the lower region of a storage cell 25 and the outflow is located in the upper region or at the end of a cell interspace 31 or the inflow is located in the upper region in the outflow in the lower region.

FIG. 3 shows a dwell time tank in a further embodiment.

In the embodiment illustrated in FIG. 3, the dwell time tank has a plurality of floors 61. The floors 61 are configured such that the liquid flows onto the uppermost floor via the inflow 57. The inflow is in this case located on one side of the floor. On that side of the floor which faces away from the inflow, an outflow 63 is formed, which serves at the same time as an inflow for the floor 61 lying underneath. The liquid flows through the outflow 63 onto the floor 61 lying underneath and, via the floor 61, to a further outflow 63 which again is arranged on the opposite side. This is repeated until the outflow 59 from the dwell time tank has been reached. By the inflows and outflows 63 being in each case arranged at opposite ends, the liquid flows through the dwell time tank 19 in a meandering manner.

A fourth embodiment of a dwell time tank is illustrated in FIG. 4.

In contrast to the embodiments illustrated in FIGS. 1 to 3, the dwell time tank 19 illustrated in FIG. 4 is designed in the form of a pipe coil 65. The heat transfer medium flows via the inflow 57 into the pipe coil 65, flows through the pipe coil, with the result that the desired dwell time is achieved, and then leaves the pipe coil 65 through the outflow 59.

In the embodiments illustrated in FIGS. 1, 3 and 4, the gas formed is entrained in the form of dispersed bubbles together with the heat transfer medium, so that, for regeneration, if there is a sufficient dwell time, the latter can react directly with the secondary products formed for regeneration purposes.

FIG. 5 shows an embodiment of the invention in which the high temperature heat exchanger and low temperature heat exchanger are arranged in one apparatus.

In the embodiment illustrated in FIG. 5, the high temperature heat exchanger 5 and low temperature heat exchanger 3 form in each case a section of the device 1. In this case, the medium, for example water, to be evaporated and to be superheated is delivered via an inflow 7 to the low temperature heat exchanger 3 used as an evaporator. In the low temperature heat exchanger 3, the medium to be evaporated flows through a first tube bundle 67 of U-shaped form. At that end of the tubes of the U-shaped tube bundle 67 which is opposite to the inflow 7, the evaporated medium is extracted from the section forming the low temperature heat exchanger 3 and is delivered by means of a saturated steam line 69 to the section forming the high temperature heat exchanger 5. In the section forming the high temperature heat exchanger 5, a second pipeline bundle 71 of U-shaped form runs, in which the medium delivered as saturated steam is superheated.

For evaporation and superheating, a heat transfer medium is used which, in the embodiment illustrated here, is carried in countercurrent to the medium to be evaporated and to be superheated. For this purpose, a deflecting sheet 73 is provided in each case in the section forming the high temperature heat exchanger 5 and in the section forming the low temperature heat exchanger 3. The deflecting sheet 73 is in this case positioned such that pipelines of the tube bundles 67, 71 of U-shaped form are led around the deflecting sheet 73. Thus, the heat transfer medium also flows around the deflecting sheet 73 along the pipelines of the U-shaped tube bundles 67, 71.

After flowing through the section forming the high temperature heat exchanger 5, the heat transfer medium is conducted into the dwell time tank 19, runs through this and passes out of the dwell time tank 19 into the section forming the low temperature heat exchanger 3, flows through the section forming the low temperature heat exchanger 3, along the pipelines, accommodated therein, of the first U-shaped tube bundle 67 and around the deflecting sheet 73, and is thereafter extracted from the low temperature heat exchanger via the heat transfer medium outflow 23.

To regenerate the heat transfer medium, a regeneration catalyst may be added to the dwell time tank 19. This regeneration catalyst is metered, for example at the inflow into the dwell time tank 19, into the heat transfer medium via an adding point 75 for the regeneration catalyst.

Alternatively, it is, of course, also possible to meter the regeneration catalyst into the dwell time tank 19 at any desired point. Preferably, however, the metering of the regeneration catalyst takes place in the region of the inflow into the dwell time tank 19 or into the heat transfer medium outflow 17 from the high temperature heat exchanger 3, said heat transfer medium outflow issuing to the dwell time tank 19.

If the regeneration catalyst used is water, this is preferably separated from the heat transfer medium downstream of the dwell time tank 19 in the flow direction, independently of the design of the high temperature heat exchanger and low temperature heat exchanger. For this purpose, it is possible, for example, to lower the pressure, so that water dissolved in the heat transfer medium changes to the gas phase. After phase separation, the water can then be condensed out of the gas phase. The condensed-out water is preferably metered into the dwell time tank 19 again as regeneration catalyst.

LIST OF REFERENCE SYMBOLS

1 Device
3 Low temperature heat exchanger
5 High temperature heat exchanger
7 Inflow to the low temperature heat exchanger
9 Outflow from the low temperature heat exchanger
11 Inflow to the high temperature heat exchanger
13 Outflow from the high temperature heat exchanger
15 Heat transfer medium inflow into the high temperature heat exchanger
17 Heat transfer medium outflow from the high temperature heat exchanger
19 Dwell time tank
21 Heat transfer medium inflow into the low temperature heat exchanger
23 Heat transfer medium outflow from the low temperature heat exchanger
25 Storage cell
27 First pipeline
29 Second pipeline
31 Cell interspace
33 Lower orifice
35 Lower region
37 Upper orifice
39 Upper region
41 First wall
43 Second wall
45 Bottom
47 Overflow
49 Gas space
51 Cover
53 Pipeline
55 Gas outlet
57 Inflow into the dwell time tank
59 Outflow from the dwell time tank
61 Floor
63 Outflow
65 Pipe coil
67 First U-shaped tube bundle
69 Saturated steam line
71 Second U-shaped tube bundle
73 Deflecting sheet
75 Adding point for the regeneration catalyst

The invention claimed is:

1. A device for heat transfer, comprising a low temperature heat exchanger (3) and a high temperature heat exchanger (5), the heat exchangers (3, 5) being connected to one another by means of a connecting line such that a heat transfer medium flows through the high temperature heat exchanger (5) and through the low temperature heat exchanger (3) in succession, wherein at least one dwell time tank (19) is arranged in the connecting line, and wherein the low-temperature heat exchanger (3) is an evaporator and the high temperature heat exchanger (5) is a super heater.

2. The device as claimed in claim 1, wherein the high temperature heat exchanger (5) and the low temperature heat exchanger (3) in each case form a section of one heat exchanger, and the connecting line branches off from the region, through which the heat transfer medium flows, of the low temperature heat exchanger and issues into that region of the high temperature heat exchanger through which the heat transfer medium flows.

3. The device as claimed in claim 2, wherein the region, through which the heat transfer medium flows, between the low temperature heat exchanger (3) and the high temperature heat exchanger (5) has a flow barrier, and the connecting line connects the regions, through which the heat transfer medium flows, of the low temperature heat exchanger (3) and of the high temperature heat exchanger (5) to one another, so that the heat transfer medium flows out of the section forming the high temperature heat exchanger (5), via the connecting line, into the section forming the low temperature heat exchanger (3) or out of the section forming the low temperature heat exchanger (3), via the connecting line, into the section forming the high temperature heat exchanger (5).

4. The device as claimed in claim 1, wherein the dwell time tank (19) comprises at least two storage cells (25), and the individual storage cells (25) are connected to one another in the direction from the low temperature heat exchanger (3) to the high temperature heat exchanger (5) in each case via a connection from the lower region of a first storage cell (25) to the upper region of an adjacent second storage cell (25).

5. The device as claimed in claim 4, wherein the connection between two storage cells (25) comprises a cell interspace (31), the connection from the cell interspace (31) to the upper region of the second storage cell (25) being formed with an overflow (47) and that from the cell interspace (31) to the lower region of the first storage cell (25) being formed by a partition (41) with an orifice (33), so that, in the case of a throughflow of the storage cells (25) from the high temperature heat exchanger (5) to the low temperature heat exchanger (3), the liquid flows in each case through the orifice (33) in the lower region of the partition (41) into the cell interspace and via the overflow (47) out of the cell interspace (31) into the second storage cell (25) or, in the case of a flow in the opposite direction, flows via the overflow (47) into the cell interspace (31) and through the orifice (33) in the lower region of the partition (41) out of the cell interspace (41) into the first storage cell (25).

6. The device as claimed in claim 4, wherein at least one storage cell (25) is closed by means of a cover (51), so that a gas space (49) is formed between the liquid in the storage cell (25) and the cover (51).

7. The device as claimed in claim 6, wherein a pipeline (53) branches off from at least one gas space (49) and is immersed into the liquid of a storage cell (25) positioned nearer to the low temperature heat exchanger (3) or into the liquid in the connection of two adjacent storage cells (25), at least one of the adjacent storage cells (25) having a lower temperature than the temperature of the storage cell (25) from the gas space (49) of which the pipeline (53) branches off.

8. The device as claimed in claim 7, wherein, in addition, a pipeline branches off from at least one gas space (49) of a storage cell (25) and is immersed into the liquid of a storage cell (25) which is positioned nearer to the high temperature heat exchanger (5).

9. The device as claimed in claim 4, wherein all the storage cells (25) are closed by means of a cover (51), and a pipeline (53) branches off at the cover (51) from all the storage cells (25), apart from that positioned nearest to the low temperature heat exchanger (3), and issues in the adjacent storage cell (25) positioned nearer to the low temperature heat exchanger (3) or in the connection of the storage cell (25) to the adjacent storage cell (25) which is positioned nearer to the low temperature heat exchanger (3), and a gas outlet (55) branches off from the cover (51) of the storage cell (25) which is positioned nearest to the low temperature heat exchanger (3).

10. The device as claimed in claim 4, wherein all the storage cells (25) are closed by means of a cover (51), and a pipeline branches off out of the cover (51) from all the storage cells (25), apart from that positioned nearest to the high temperature heat exchanger (5), and is immersed into the liquid of the adjacent storage cell (25) which is positioned nearer to the high temperature heat exchanger (5).

11. The device as claimed in claim 7, wherein, at least one end, immersed into the liquid, of the pipeline (53), a gas distributor is formed, by means of which gas flowing through the pipeline (53) is distributed in the form of small bubbles in the liquid.

12. The device as claimed in claim 7, wherein the pipelines (53) branching off from the cover (51) are immersed at least into the lower third of the liquid when the storage cell (25) is filled as far as the overflow (47).

13. The device as claimed in claim 7, wherein a compressor, by means of which the gas is transported into the liquid of the adjacent storage cell (25) or into the cell interspace (31), is accommodated in the pipeline (53).

14. The device as claimed in claim 4, wherein a device for conveying the liquid is arranged in the connection between two adjacent storage cells (25).

15. The device as claimed in claim 1, wherein an adding point for a regeneration catalyst (75) is positioned upstream of a dwell time tank (19).

16. The device as claimed in claim 15, wherein a control unit or regulating unit is comprised, by means of which the addition of the regeneration catalyst is controlled and/or regulated.

17. The device as claimed in claim 1, wherein the heat transfer medium is a molten salt.

18. The device as claimed in claim 17, wherein the regeneration catalyst is water.

19. A solar power plant comprising the device as claimed in claim 1 as an evaporator and superheater.

* * * * *